July 25, 1961     A. H. WEIERTZ     2,993,730

TWO-DOOR AUTOMOBILES WITH FOLDING DOORS

Filed Oct. 20, 1958

INVENTOR:

Axel H. WEIERTZ

By:

Wenderoth, Lind & Ponack

Attys

United States Patent Office 2,993,730
Patented July 25, 1961

2,993,730
TWO-DOOR AUTOMOBILES WITH FOLDING DOORS
Axel Hugo Weiertz, Bellevuevagen 24, Malmo, Sweden
Filed Oct. 20, 1958, Ser. No. 768,451
Claims priority, application Sweden Oct. 23, 1957
2 Claims. (Cl. 296—49)

This invention relates to automobiles having front and rear seats for the driver and passengers and a single outwardly opening door on either side. In such automobiles it has already been suggested, as is shown and described in U.S. Patent 2,743,773, to divide the door on either side of the automobile into a relatively narrow front portion hinged at its front edge to the automobile body and a relatively wide rear portion hinged at its front edge to the rear edge of the front portion in order that the door may be given a sufficient width to permit convenient entrance to both the front seat and the rear seat of the automobile without the backrest of the front seat having to be tilted forward in the manner otherwise customary in two-door automobiles and without the large width of the door being unsuitable from the viewpoint of traffic safety or impractical with respect to the often cramped space in parking lots and garages.

According to said prior suggestion a parallel motion mechanism for the wide rear portion of the door is inserted between said portion of the door and the automobile body for controlling the movement of the wide rear portion of the door when opening and closing the door. From this prior art the present invention differs by providing, as a substitute for the parallel motion mechanism for the wide rear door portion of the prior construction, a mechanism of a different and more simple kind, which ensures or sufficiently facilitates a safe control over the wide rear portion of the door when opening and closing the door. This mechanism is in the nature of a motion limiting mechanism which is inserted between the two door portions and limits the swingability of the wide rear portion of the door relatively to the narrow front portion thereof to an angle of at most about, and preferably somewhat less than, 90°, say to an angle of between 60° and 80°. In combination with such a motion limiting mechanism the invention comprises means improving the contemplated function of said mechanism and increasing its practical applicability, as will appear from the following detailed description of a number of forms chosen by way of examples for elucidating the invention and illustrated in the accompanying drawings, in which:

Figure 1:
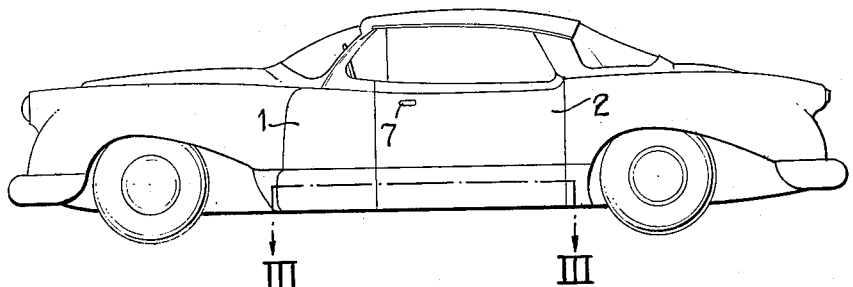
FIG. 1 is a side view of an automobile with its folding door in closed position.

As will appear from the drawings, the door which permits entrance both to the front seat and the back seat of the automobile is divided into a narrow front portion 1 and a wide rear portion 2. The front portion of the door is hung at its front edge to the automobile body 3 by means of hinges including a pivot pin 4, and the rear portion 2 of the door is hung at its front edge to the rear edge of said front portion 1 by means of hinges including a pivot pin 5. Opening and closing of the door from inside the automobile can be effected with the aid of a servomotor, e.g. a hydraulic or pneumatic servomotor as in the form of FIGS. 2-4.

In the figures, the motion limiting mechanism inserted between the two door portions 1 and 2 comprises a rod 39 which is pivoted at one end by means of a pin 38 to the rear portion 2 of the door at the front edge of said portion. Said rod 39 has an abutment 40 for coaction with a stop 41 on the front portion 1 of the door at the rear edge of said portion. The rod 39 cooperates at its other end by means of a roller 42 with a trackway 43 in the front portion 1 of the door, and at said last-mentioned end the rod 39 is connected to the piston rod 44 of a hydraulic or pneumatic piston servomotor, the cylinder 45 of which (see FIG. 3) is hingedly secured to the automobile body. The arrangement is such that the door can be opened and closed by admission of a pressure medium to one or the other side of the piston in the servomotor cylinder 45. At the opening of the door by means of the servomotor the movable rod 39 is supported, by means of a path 46 on said rod, on a supporting roller 47 which is mounted for rotation about the pivot pin 4 in the automobile body. At the closing of the door by means of the servomotor the rod 39 is supported via the roller 42 on the trackway 43 in the front portion 1 of the door. A spring, for instance a torsion spring 48 mounted about the pivot pin 5, can be so inserted between the door portions 1 and 2 as to tend to swing the rear portion 2 of the door about the pivot pin 5 from the position shown in FIG. 8 toward the position shown in FIG. 4 in relation to the front portion 1 of the door.

Figure 2:
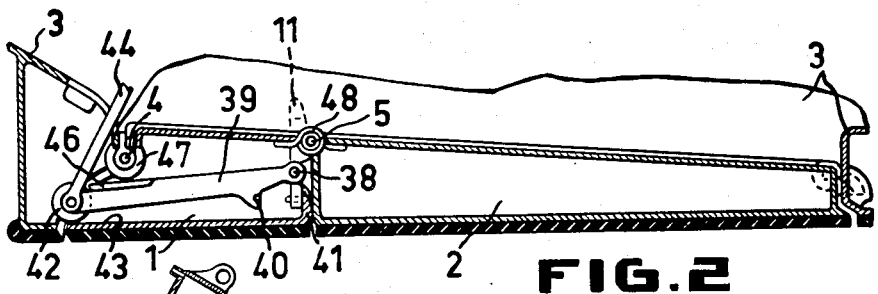
FIGS. 2, 3 and 4 are horizontal sections taken along line III—III of FIG. 1 with the door in closed position (FIG. 2) and in different opening positions (FIGS. 3 and 4).
Figure 3:
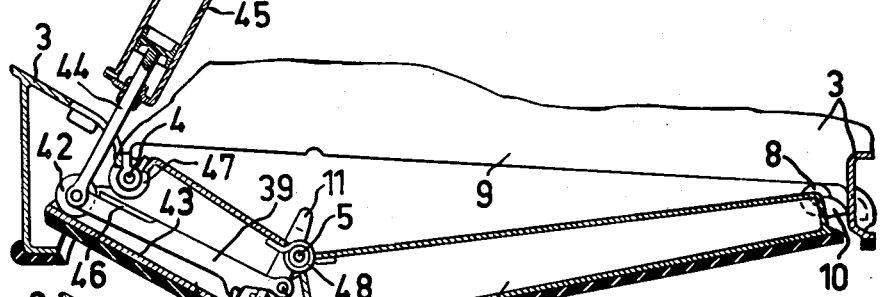
Figure 4:
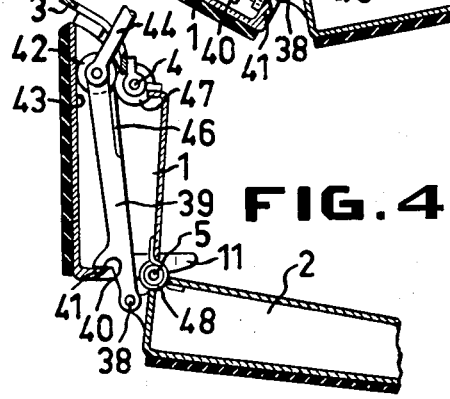

As will be apparent in the open position of the door, the rear portion 2 thereof can be swung about the pivot pin 5 to any position whatever between the position shown in FIG. 4 and that which is the same as that prevailing between the two door portions when the door is closed, and the position shown to which the swingability of the rear portion 2 of the door in relation to the front portion 1 is limited by the motion limiting mechanism inserted betwen the two door portions. The angular distance about the pivot pin 5 between these two extreme positions of the rear portion 2 of the door in relation to the front portion 1 thereof is about or less than 90°, preferably between 60° and 80°, so that the angle facing the door opening and prevailing between the two door portions in their end positions shown by full lines in FIG. 2 is at least about 90° and preferably 100°–120°.

What I claim and desire to secure by Letters Patent is:
1. The combination comprising an autocar body having on each side a single door opening outwards and comprising a front portion hinged at its front edge to said car body and a rear portion hinged at its front edge to the rear edge of said front portion, a rod movable within said front portion and pivotally connected at one end to said rear portion, coacting abutments on said movable rod and on said front portion for limiting the swingability of said rear portion in relation to said front portion, a servomotor pivotally connected to said autocar body and having a projecting piston rod pivotally connected to the other end of said movable rod for opening and closing the door, and means guiding said movable rod in said front portion and comprising a roller mounted on said movable rod at said other end thereof, a second roller mounted for rotation about the axis of the hinges of said front portion at the front edge thereof, a track in said front portion for said first roller to coact with, and a track on said movable rod for coaction with said second roller.

2. The combination claimed in claim 1 and a torsion spring mounted around the axis of the hinges between said front and rear portions of the door and connecting them for swinging said rear portion of the door in relation to said front portion of the door.

References Cited in the file of this patent
UNITED STATES PATENTS
689,201    Koester _____ Dec. 17, 1901
(Other references on following page)

UNITED STATES PATENTS

| | | |
|---|---|---|
| 814,288 | Hausfeld | Mar. 6, 1906 |
| 828,082 | Bartholomew | Aug. 7, 1906 |
| 948,656 | Young | Feb. 8, 1910 |
| 2,322,372 | Levy | June 22, 1943 |
| 2,743,773 | Weiertz | May 1, 1956 |
| 2,770,297 | Mercier et al. | Nov. 13, 1956 |
| 2,807,461 | Nes | Sept. 24, 1957 |

FOREIGN PATENTS

| | | |
|---|---|---|
| 947,139 | Germany | Aug. 9, 1956 |